United States Patent
Karandikar et al.

(10) Patent No.: US 12,079,896 B2
(45) Date of Patent: Sep. 3, 2024

(54) DYNAMIC CLOCK AND VOLTAGE SCALING (DCVS) LOOKAHEAD BANDWIDTH VOTING USING FEEDFORWARD COMPRESSION RATIO

(71) Applicant: QUALCOMM INCORPORATED, San Diego, CA (US)

(72) Inventors: Prashant Dinkar Karandikar, Bangalore (IN); Pradeep Venkatasubbarao, Bangalore (IN); Manmohan Manoharan, Bengaluru (IN); Vivekanandan Naveen, Bangalore (IN); Nagashree Ganapati Upadhya, Bangalore (IN); Shubham Sangal, Bangalore (IN); Srinivas Turaga, Bangalore (IN); Shreya Pandurang Math, Dombivili (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/736,030

(22) Filed: May 3, 2022

(65) Prior Publication Data

US 2023/0360166 A1 Nov. 9, 2023

(51) Int. Cl.
*G06T 1/20* (2006.01)
*G06F 1/08* (2006.01)
*G06T 1/60* (2006.01)

(52) U.S. Cl.
CPC ............. *G06T 1/20* (2013.01); *G06F 1/08* (2013.01); *G06T 1/60* (2013.01)

(58) Field of Classification Search
None
See application file for complete search history.

(56) References Cited

U.S. PATENT DOCUMENTS

| | | |
|---|---|---|
| 8,327,158 B2 | 12/2012 | Titiano et al. |
| 10,108,564 B2 | 10/2018 | Zhou |
| 10,211,947 B2 | 2/2019 | Kim |
| 11,039,151 B2 | 6/2021 | He et al. |
| (Continued) | | |

OTHER PUBLICATIONS

PCT International Search Report and Written Opinion transmitted on Aug. 3, 2023 from Corresponding PCT App. Ser. No. PCT/US2023/017460, filed Apr. 4, 2023; First Named Inventor: Prashant Dinkar Karandikar et al., Title: System and Method for Controlling Memory Frequency Using Feed-Forward Compression Statistics, published as WO 2023-215062 on Nov. 9, 2023, 11 pages.

*Primary Examiner* — Nicholas R Wilson
(74) *Attorney, Agent, or Firm* — Smith Tempel Blaha LLC/Qualcomm

(57) ABSTRACT

In a computing device having a pipeline of image processing components, DCVS bandwidth voting may be based on a feedforward compression ratio determined by the first image processing component in the pipeline. The DCVS bandwidth voting may be based on the result of a comparison of change in the feedforward compression ratio with a threshold. Transaction initiator components in the pipeline may select their votes for bandwidth from among a feedforward compression ratio-based value and one or more other values, based on the result of the comparison with the threshold. DCVS parameters may be selected based on bandwidth votes received from transaction initiator components.

34 Claims, 6 Drawing Sheets

(56) References Cited

U.S. PATENT DOCUMENTS

2017/0083262 A1* 3/2017 Gadelrab .............. G06F 3/0661
2017/0212581 A1 7/2017 Park et al.
2021/0149686 A1 5/2021 Severson et al.

* cited by examiner

DYNAMIC CLOCK AND VOLTAGE SCALING (DCVS) LOOKAHEAD BANDWIDTH VOTING USING FEEDFORWARD COMPRESSION RATIO

TECHNICAL FIELD

The following relates generally to computing devices and components thereof, and more specifically to dynamic clock and voltage scaling ("DCVS") bandwidth voting in such devices.

DESCRIPTION OF THE RELATED ART

A computing device may include multiple subsystems, cores or other components. Such a computing device may be, for example, a portable computing device ("PCD"), such as a laptop or palmtop computer, a cellular telephone or smartphone, portable digital assistant, portable game console, etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

As a PCD is powered by a battery, power management is an important consideration. "Power management" refers to techniques used to balance power consumption and performance in a PCD, as well as to manage the generation of thermal energy (i.e., heat). Dynamic clock and voltage scaling ("DCVS") is a technique by which the frequency and voltage at which a processor or processing subsystem is operated are adjusted dynamically, i.e., in real time in response to changes in operating conditions, to deliver a desired balance or tradeoff between power consumption and performance level. When lower power consumption is of higher priority than higher performance, the DCVS level (i.e., clock frequency and voltage) may be decreased, and when higher performance is of higher priority than lower power consumption, the DCVS level may be increased. The DCVS level may be selected using a voting scheme in which components may submit votes for the amount of bandwidth the component estimates it needs to achieve a performance level supporting the use case under which the component is then operating.

At the start of a multimedia use case, such as capturing a video image, a processing component or subsystem, such as a camera or image capture and processing subsystem, video subsystem, display subsystem or a GPU, may submit a vote for a worst-case estimated amount of bandwidth, because the content of the incoming image is initially unknown. Bandwidth needs can vary depending on the content. For example, while a processing system may need little bandwidth to compress or decompress a solid color, a processing system may need a large amount of bandwidth to attempt to compress or decompress a very noisy image. Image resolution is also a factor in compression. A lower compression ratio may be achievable for an image with a lower resolution than for the same image with a higher resolution. It may also be noted that while a solid color is highly compressible, i.e., a very high compression ratio is achievable, a more noisy image is relatively uncompressible, i.e., only a low compression ratio is achievable. Also, at times during a multimedia use case other than the start of image capture the image content may change drastically from the previous frame to the current frame. When a component determines a new bandwidth need and submits a vote accordingly, it takes a finite amount of time for the corresponding DCVS level change to be made. "Look-ahead" voting, in which an estimate of the bandwidth needed to process the next frame is based on the result of processing one or more previous frames, may be employed to attempt to reduce this delay. Nevertheless, it would be desirable to further reduce delays between an image content change (or multimedia use case start) and a DCVS level change.

SUMMARY OF THE DISCLOSURE

Systems, methods, computer-readable media, and other examples are disclosed for DCVS bandwidth voting.

An exemplary system for DCVS bandwidth voting may include a bandwidth vote aggregator and a plurality of image processing components coupled together in a pipeline. A first image processing component in the pipeline may be configured to determine a feedforward compression ratio based on a current frame of an image. The plurality of image processing components may include a plurality of transaction initiator components. One or more transaction initiator components may be configured to determine a change in the feedforward compression ratio from a preceding frame to the current frame, to compare the change in the feedforward compression ratio with a threshold, and to select a bandwidth vote from among a feedforward compression ratio-based value and one or more other values based on the result of the comparison. The bandwidth vote aggregator may be configured to determine a DCVS level based on a plurality of bandwidth votes received from the plurality of transaction initiator components.

An exemplary method for DCVS bandwidth voting may include determining a feedforward compression ratio based on a current frame of an image. A first image processing component in a pipeline comprising a plurality of image processing components may perform this determination of a feedforward compression ratio. The exemplary method may also include determining a change in the feedforward compression ratio from a preceding frame to the current frame. The exemplary method may further include comparing the change in the feedforward compression ratio with a threshold. A transaction initiator component of a plurality of transaction initiator components in the pipeline may perform this determination of a change in the feedforward compression ratio and comparison of the change with the threshold. The exemplary method may still further include selecting a bandwidth vote from among a feedforward compression ratio-based value and one or more other values based on the result of comparing the change in the feedforward compression ratio with the threshold. The transaction initiator component may perform this bandwidth vote selection. The exemplary method may yet further include determining a DCVS level based on a plurality of bandwidth votes received from the plurality of transaction initiator components. A bandwidth vote aggregator may perform this determination of a DCVS level.

Another exemplary system for DCVS bandwidth voting may include means for determining a feedforward compression ratio based on a current frame of an image. The exemplary system may also include means for determining a change in the feedforward compression ratio from a preceding frame to the current frame. The exemplary system may further include means for comparing the change in the feedforward compression ratio with a threshold. The exemplary system may still further include means for selecting a bandwidth vote from among a feedforward compression ratio-based value and one or more other values based on the result of comparing the change in the feedforward compression ratio with the threshold. The exemplary system may yet further include means for determining a DCVS level based on a plurality of bandwidth votes received from a plurality of transaction initiator components.

An exemplary computer-readable medium for DCVS bandwidth voting may be provided. The computer-readable medium may comprise a non-transitory computer-readable medium having instructions stored thereon in computer-executable form. The instructions, when executed by a processing system of a computing device, may configure the processing system to control the following. The instructions may configure the processing system to control determining a feedforward compression ratio based on a current frame of an image. The instructions may also configure the processing system to control determining a change in the feedforward compression ratio from a preceding frame to the current frame. The instructions may further configure the processing system to control comparing the change in the feedforward compression ratio with a threshold. The instructions may still further configure the processing system to control selecting a bandwidth vote from among a feedforward compression ratio-based value and one or more other values based on the result of comparing the change in the feedforward compression ratio with the threshold. The instructions may yet further configure the processing system to control determining a DCVS level based on a plurality of bandwidth votes received from a plurality of transaction initiator components.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1A:
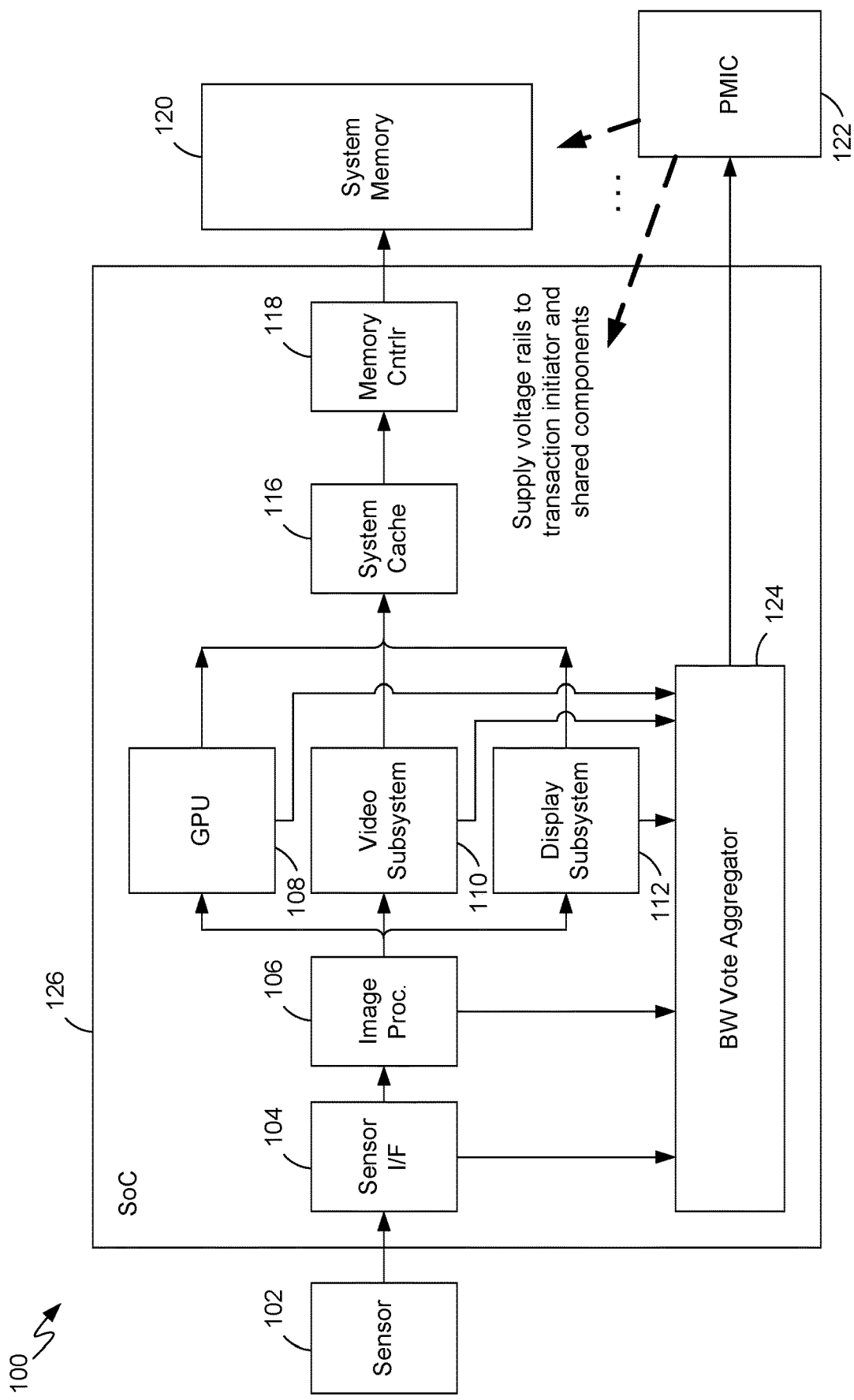
FIG. 1A is a block diagram illustrating a system for DCVS bandwidth voting, in accordance with exemplary embodiments.

As shown in FIG. 1A, a system 100 may include, in a pipelined arrangement of image processing components, an image sensor 102, a sensor interface 104, and an image processor 106. The system 100 may further include a graphics processing unit ("GPU") 108, a video subsystem 110, and a display subsystem 112. In the pipelined arrangement of image processing components: an input of the sensor interface 104 may be coupled to an output of the image sensor 102; an input of the image processor 106 may be coupled to an output of the sensor interface 104; and an input of each of the GPU 108, the video subsystem 110, and the display subsystem 112 may be coupled to an output of the image processor 106.

The system 100 may also include a system cache 116, a memory controller 118, and a system memory 120. In the pipelined arrangement of image processing components, the system cache 116 may be configured in some modes of operation (e.g., streaming captured image data to memory) to receive image data from any of the GPU 108, video subsystem 110, and display subsystem 112. In such a mode of operation, the system memory 120 may be configured to receive image data from the system cache 116 via the memory controller 118.

The sensor interface 104 may be configured to receive image data from the image sensor 102 in the form of a stream of frames representing a captured image. The sensor interface 104 may be configured to perform image pre-processing, such as, for example, compressing the image, correcting exposure, focus, white balance, etc. The image processor 106 may be configured to receive data processed by the sensor interface 104 and perform further processing, such as, for example, image scaling. The GPU 108 may be configured to receive data processed by the image processor 106 and perform still other image processing. The video subsystem 110, which may include a codec, may be configured to receive data processed by the image processor 106 and perform further data compression. The display subsystem 112 may be configured to receive data processed by the image processor 106 and display results, such as preview frames, for viewing by a user. This direction of data flow, from the sensor interface 104 through the image processor 106 and then through one or more of the GPU 108, video subsystem 110, and display subsystem 112, may be referred to as "downstream." In accordance with this terminology, the location of, for example, the image processor 106 may be described as downstream of the sensor interface 104 in the pipeline. Similarly, the location of, for example, the GPU 108 may be described as downstream of the image processor 106 in the pipeline. Nevertheless, in other modes of operation, any of the GPU 108, video subsystem 110, and display subsystem 112 may be configured to operate on data processed by a component further downstream. In such a mode of operation, data may flow upstream.

The sensor interface 104, the image processor 106, the GPU 108, the video subsystem 110, and the display subsystem 112 may be referred to as transaction initiator components because they may initiate memory transactions with the system memory 120 (e.g., via the memory controller 118, system cache 116, etc.). Other transaction initiator components, such as a central processing unit ("CPU") may also be included but are not shown for purposes of clarity. Rather, only examples of transactions initiator components that are image processing components, such as the GPU 108, the video subsystem 110, and the display subsystem 112, and which may be configured in a pipeline, are shown in the illustrated embodiment. The system memory 120, memory controller 118, and system cache 116 may be referred to as "shared components" because their use may be shared among transaction initiator components.

The system 100 may include power management circuitry, such as a power management integrated circuit or "PMIC" 122. The PMIC 122 may be configured to provide selected power supply voltage levels to the transaction initiator and shared components, as indicated by the broken-line arrows. Through related clock signal distribution circuitry, clocks signals having selected frequencies may be provided to the transaction initiator components and shared components. As understood by one of ordinary skill in the art, the PMIC 122 and related circuitry may implement dynamic clock and voltage scaling ("DCVS"). In response to a request indicating requested or selected power supply voltages and requested or selected clock frequencies, the PMIC 122 may provide power supply voltages of the selected levels and clock signals of the selected frequencies to the transaction initiator components and shared components.

The system 100 may include a bandwidth ("BW") vote aggregator 124. As described below, the BW vote aggregator 124 may be configured to obtain BW votes provided by one or more of the sensor interface 104, image processor 106, GPU 108, video subsystem 110, and display subsystem 112, which are the transaction initiator components in the illustrated example. The BW votes represent amounts of bandwidth (e.g., in units of gigabytes per second) that the transaction initiator components request. The BW vote aggregator 124 may be configured to aggregate the BW votes and, based on a result of the aggregation operation, may select at least one DCVS level. A DCVS level represents or corresponds to a BW level, expressed as a combination of power supply voltage level and clock frequency. As understood by one of ordinary skill in the art, the aggregation operation may be implemented using, for example, a lookup table (not shown). The sensor interface 104, image processor 106, GPU 108, video subsystem 110, and display subsystem 112 each may provide a BW vote for each of the shared components. The BW vote aggregator 124 may select a DCVS level for each of the shared components and transaction initiator components based on the BW votes and provide indications of these selected DCVS levels to the PMIC 122.

In capturing video imagery, a stream or succession of image frames may be processed. The sensor interface 104 may be configured to compress each successive image frame in the stream received from the image sensor 102. The sensor interface 104 may compress each image frame in accordance with a compression ratio ("CR"). As understood by one of ordinary skill in the art, the CR may be related to the image content. For example, an image that has noisy characteristics may be less compressible (i.e., lower CR is achievable) than an image that has less noisy characteristics. An image consisting of one or only a few solid color regions, for example, may be highly compressible (i.e., high CR is achievable). Also, an image captured at a lower resolution may be less compressible than the same image captured at a higher resolution. The CR achieved by the sensor interface 104 thus may change from frame to frame. The sensor interface 104 may provide an indication to the image processor 106 of the CR that the sensor interface 104 was able to achieve on a current frame before the image processor 106 in turn receives that frame. This CR that the sensor interface 104 is able to achieve on a current frame may be referred to herein as the "feedforward CR." The image processor 106 may, in turn, propagate this feedforward CR to image processing components further downstream in the processing pipeline, such as the GPU 108, video subsystem 110, and display subsystem 112. Some or all (but at least one) of the transaction initiator components may be configured to compute a change in the feedforward CR from the previous frame to the current frame. In some examples, a computed change in the feedforward CR may be propagated to image processing components further downstream in the processing pipeline. Each of the transaction initiator components may be configured to determine the change in the feedforward CR from the previous frame to the current frame, either by computing the change directly from the feedforward CRs of the previous frame and the current frame or by receiving the change computed by an upstream transaction initiator component.

Figure 1B:
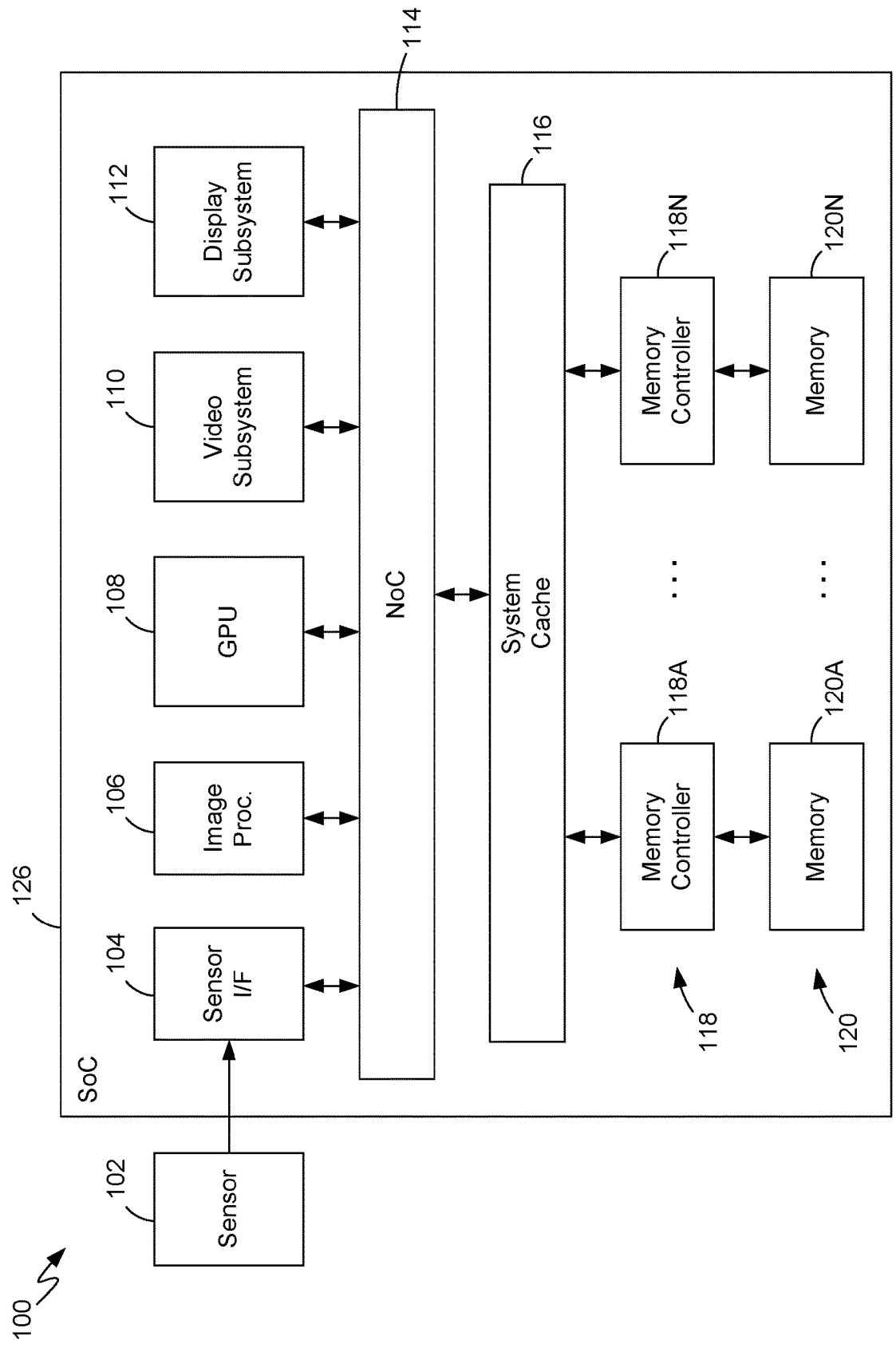
FIG. 1B is another block diagram illustrating a system for DCVS bandwidth voting, in accordance with exemplary embodiments.

As shown in FIG. 1B, in some examples transaction initiator components may be functionally coupled in a pipelined arrangement but physically interconnected via a network-on-a-chip ("NoC") 114 or other data interconnect. That is, the sensor interface 104, the image processor 106, the GPU 108, the video subsystem 110, the display subsystem 112, etc., each may be connected to the NoC 114, which enables bidirectional data communication between any of them. As understood by one of ordinary skill in the art, the NoC 114 may be an active interconnect analogous to a matrix of or one or more data communication buses. Nevertheless, in other embodiments (not shown) a straightforward data communication bus may alternatively be employed. The NoC 114 is yet another shared component and may be provided with a power supply voltage and clock frequency by the PMIC 122 in the same manner described above with regard to other shared components.

The system 100 may, in operation, dynamically configure itself (e.g., by execution of software) into a processing pipeline of the type described above with regard to FIG. 1A. For example, the system 100 may dynamically (i.e., in operation) configure the output of the sensor interface 104 to be functionally coupled to the input of the image processor 106, configure the output of the image processor 106 to be functionally coupled to the input of the GPU 108 or the video subsystem 110 or display subsystem 112, etc. In some examples the coupling between components in the pipeline may be static (e.g., hardwired), while in other examples the coupling may be dynamic (e.g., via an interconnect such as the NoC 114), and in still other examples some components may be statically coupled and others dynamically coupled. Unless stated otherwise with regard to a particular example, the term "coupled" as used herein encompasses all such manner of configuration. Also, although the data flow may be functionally pipelined between two components, the data may be physically routed through one or more intermediary components, which may include not only the NoC 114 but also the system memory 120 or other memory, such as the cache 116.

Data may be stored in the system memory 120 in compressed form. Each image processing component in the pipeline (e.g., the sensor interface 104, the image processor 106, the GPU 108, the video subsystem 110, or the display subsystem 112) may include data compression and decompression logic. With the exception of the sensor interface 104, which may receive its input data directly from the sensor 102, an image processing component may read its input data from the system memory 120 and decompress that data. An image processing component may perform processing on the decompressed data, compress the resulting processed data, and store the processed, compressed data in the system memory 120. Such compressed data stored in the system 120 may form the input data of the next (i.e., downstream) image processing component in the pipeline.

In some examples there may be two or more memories 120A-120N, and there may be two or more memory controllers 118A-118N. Note that the PMIC 122 and BW vote aggregator 124 are not shown in FIG. 1B for purposes of clarity but may be included and may function as described with regard to FIG. 1A.

The example described with regard to FIG. 1A, in which the sensor interface 104 is the first image processing component in the pipeline, may correspond to a video capture use case. Nevertheless, in other examples (not shown), corresponding to other use cases, a component other than the sensor interface 104 may be the first image processing component in the pipeline. For example, in a video playback use case the video subsystem 110 may be the first image processing component in the pipeline, and in a video gaming use case the GPU 108 may be the first image processing component in the pipeline, etc. Still other uses cases, image processing components, and pipeline arrangements will occur readily to one of ordinary skill in the art in view of the descriptions herein.

The sensor interface 104, image processor 106, GPU 108, video subsystem 110, display subsystem 112, NoC 114, system cache 116, and memory controller 118 may be provided on a system-on-a-chip ("SoC") 126 along with various other components and subsystems (e.g., a CPU), which are not shown in FIGS. 1A-1B for purposes of clarity. Nevertheless, in other embodiments such components may be arranged on one or more chips in any other manner. For example, in another embodiment one or more image sensors may be included on the same SoC as the image processing components.

Figure 2:
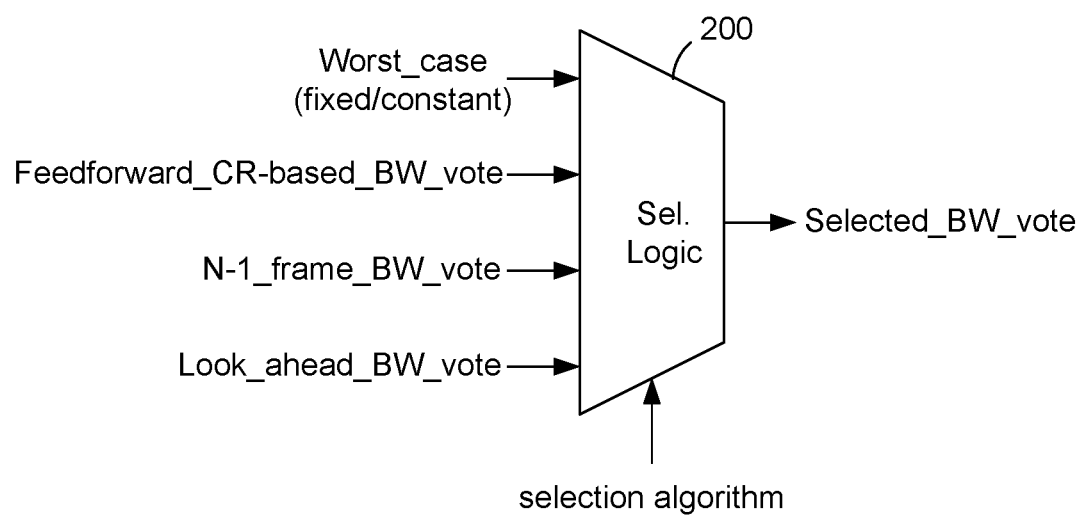
FIG. 2 is a conceptual logic diagram illustrating selection of a bandwidth vote type based on a selection algorithm.

As shown in FIG. 2, selection logic 200 may be configured to select the above-described BW vote from among a BW based on the above-described feedforward CR ("Feedforward_CR-based_BW_vote" in FIG. 2) and one or more other values: a fixed worst-case value (i.e., a constant); a measurement of an amount of bandwidth used to process a previous frame ("N−1_frame_BW_vote"); or an estimated amount of bandwidth to process a next frame ("Look_ahead_BW_vote"). The Feedforward_CR-based_BW_vote may be, for example, the result of multiplying the feedforward CR by the BW without compression (described below), or the result of other computations based on the feedforward CR. The "other values" are described in further detail below. The Feedforward_CR-based_BW_vote, the fixed worst-case value, the N−1_frame_BW_vote, and the Look_ahead_BW_vote may also be referred to as four types of BW votes. The selection logic 200 may be configured to select one of these four types of BW votes every frame.

The selection logic 200 may be included in each of the above-described transaction initiator components that is configured to provide a BW vote, such as the GPU 108, the video subsystem 110, and the display subsystem 112. The selection logic 200 is depicted in a conceptual manner in FIG. 2 for purposes of clarity but may be implemented in any manner, such as, for example, a selection algorithm with which a processor is configured (e.g., by software, firmware, etc.).

The fixed worst-case value ("Worst_case" in FIG. 2) may be the lowest CR or highest BW required by the transaction initiator component (e.g., due to a very noisy frame, a low-resolution frame, etc.). The fixed worst-case value is fixed or a constant in the sense that the value is the same regardless of image content or type of processing operation. Generally, the fixed worst-case value may equal the BW without compression. The "BW without compression" is the BW the component uses to process the frame of data (e.g., an image processing operation performed by the image processor 106, a graphics processing operation performed by the GPU 108, etc.). As described above, with the exception of the sensor interface 104, which receives data in uncompressed or raw form directly from the sensor 102, a component may process the data after reading compressed data from the system memory 120 (FIGS. 1A-1B) and decompressing it. The component may then compress the processed data and write the processed, compressed data to the system memory 120. As understood by one of ordinary skill in the art, a component may determine the BW without compression based on factors which may include image resolution, frame rate, etc. Note that the BW with compression is the BW without compression divided by the CR.

The measurement of the amount of bandwidth used by the transaction initiator component to process the previous frame ("N−1_frame_BW_vote" in FIG. 2) may be based on a count of the number of beats in all transactions initiated by that transaction initiator component in processing the previous ("N−1"th) frame (where the "N"th frame is the frame the transaction initiator component is processing at the time the transaction initiator component provides the above-described BW vote). Alternatively, the N−1_frame_BW_vote may be based on other measures of performance, etc., as measured by instrumentation (not shown) in shared components downstream of the transaction initiator component, such as the NoC 114, system cache 116, memory controller 118, system memory 120, etc., as understood by one of ordinary skill in the art.

The estimated amount of bandwidth to process the next frame ("Look_ahead_BW_vote" in FIG. 2) may be determined by the transaction initiator component in various ways, which may depend upon the type of transaction initiator component, as understood by one of ordinary skill in the art. For example, the GPU 108 may be performing a scaling operation on an image frame provided by the image processor 106. In such an example (i.e., where the transaction initiator component is reading data from an upstream component and writing data to a downstream component), the feedforward CR provided by the sensor interface 104 may represent the read-side BW requirement of the GPU 108. The write-side BW requirement of the GPU 108 may be based on the scaling value and compression ratio achieved by the GPU 108. In such an example, the Look_ahead_BW_vote that the selection logic 200 of the GPU 108 may select may be the sum of the read-side and write-side BW requirements of the GPU 108.

Figure 3:
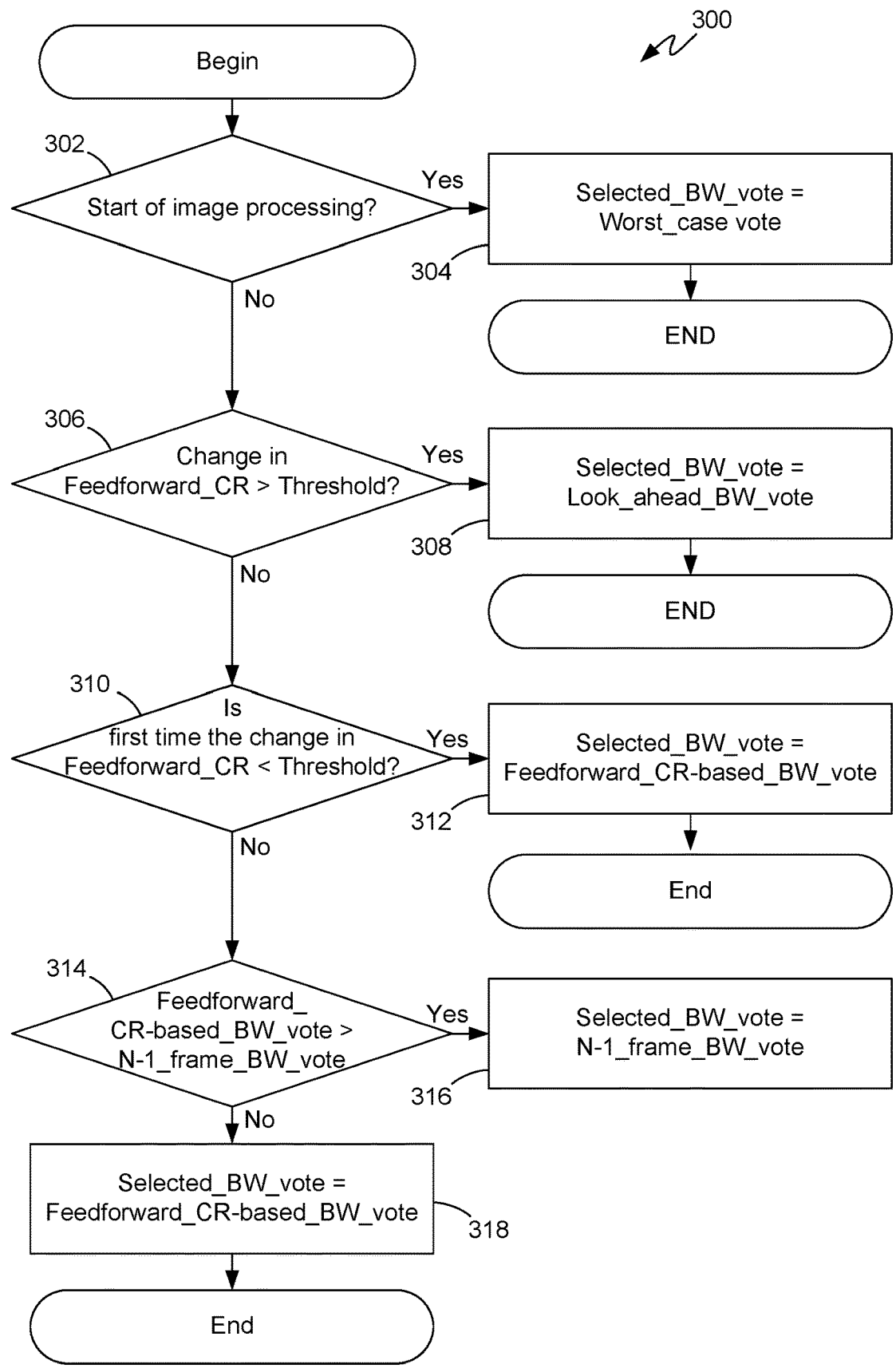
FIG. 3 is a flow diagram illustrating a method for DCVS bandwidth voting.

In FIG. 3, a method 300 for selecting a BW vote is illustrated. The above-described selection logic 200 (FIG. 2) may be configured to control some or all of the method 300. Each transaction initiator component or its selection logic 200 may be an example of means for performing the functions set forth in the method 300. The method 300 may include the following.

As indicated by block 302, the method 300 may include determining whether image processing has just started, i.e., whether the first image processing component in the pipeline has not yet processed a first frame of the image. If this is the start of image processing, then each transaction initiator component may select as its BW vote the above-described fixed worst-case value, as indicated by block 304. Note that in the exemplary method 300 the BW vote is only set to the fixed worst-case value at the start of image processing. At other times, the BW vote is set to other values as follows.

As indicated by block 306, the method 300 may include comparing the change in the feedforward CR from the previous frame to the current frame with a threshold and determining whether the change is greater than the threshold. As described above, the first image processing component in the pipeline may determine the feedforward CR. For example, in a video capture use case the sensor interface 104 (FIGS. 1A-1B) may determine the feedforward CR. A change in the feedforward CR that exceeds the threshold indicates that the image content has changed substantially from the previous frame to the current frame. If the transaction initiator component determines (block 306) that the change in the feedforward CR is greater than the threshold, then the transaction initiator component may select as its BW vote the above-described Look_ahead_BW_vote, as indicated by block 308.

If it is determined (block 306) that the change in the feedforward CR is not greater than the threshold, then either the Feedforward_CR-based_BW_vote or the N−1_frame_BW_vote may be selected. Whether the Feedforward_CR-based_BW_vote or the N−1_frame_BW_vote is selected may be based on the following, for example. As indicated by block 310, the method 300 may include determining whether this is the first time the change in the feedforward CR has been less than the threshold (per block 306), i.e., whether the change in the feedforward CR has been less than the threshold for fewer than two consecutive frames. If the transaction initiator component determines (block 310) that this is the first time the change in the feedforward CR has been less than the threshold, then the transaction initiator component may select as its BW vote the Feedforward_CR-based_BW_vote, as indicated by block 312. If the transaction initiator component determines (block 310) that this is not the first time the change in the feedforward CR has been less than the threshold, then the transaction initiator component may perform the determination indicated by block 314.

As indicated by block 314, it may be determined whether the Feedforward_CR-based_BW_vote is greater than the N−1_frame_BW_vote. If the transaction initiator component determines (block 314) that the Feedforward_CR-based_BW_vote is greater than the N−1_frame_BW_vote, then the transaction initiator component may select as its BW vote the N−1_frame_BW_vote, as indicated by block 316. However, if the transaction initiator component determines (block 314) that the Feedforward_CR-based_BW_vote is not greater than the N−1_frame_BW_vote, then the transaction initiator component may select as its BW vote the Feedforward_CR-based_BW_vote, as indicated by block 318. It may be noted that the selection of the Feedforward_CR-based_BW_vote as the BW vote (via either block 312 or block 318) is broadly based on the determination or condition indicated in block 306 that the feedforward CR is less than (or equal to) the threshold. The selection of the Feedforward_CR-based_BW_vote as the BW vote may be further based on additional conditions, such as, for example, the conditions indicated in blocks 310 and 314. In either case (i.e., selecting the Feedforward_CR-based_BW_vote as the BW vote via either block 312 or block 318), the Feedforward_CR-based_BW_vote is selected when the change in the feedforward CR is less than (or equal to) the threshold.

Each transaction initiator component, such as the sensor interface 104, image processor 106, GPU 108, video subsystem 110, display subsystem 112, etc. (FIGS. 1A-1B), may be configured to select a BW vote in the manner described above with regard to the method 300 (FIG. 3) and to provide its selected BW vote to the BW vote aggregator 124 (FIGS. 1A-1B). Based on the BW votes collectively received from the transaction initiator components, the BW vote aggregator 124 may be configured to select or determine a DCVS level. The DCVS level may be characterized by one or more DCVS parameters, such as the power supply voltage level, the clock signal frequency, or a combination of power supply voltage level and clock signal frequency.

The BW vote aggregator 124 may employ any method for determining (i.e., selecting) the DCVS level. For example, the BW vote aggregator 124 may select a DCVS level corresponding to the sum of the received BW votes. In an example in which the BW votes received by the BW vote aggregator 124 consist of a first BW vote indicating a bandwidth of 2 gigabytes per second (GB/s) and a second BW vote indicating a bandwidth of 1 GB/s, the BW bandwidth vote aggregator 124 may select or determine a DCVS level corresponding to a BW of 3 GB/s, which is the sum of the 2 GB/s and 1 GB/s BW votes. As understood by one of ordinary skill in the art, the BW vote aggregator 124 may, for example, employ a lookup table (not shown) or other data structure or algorithm that relates multiple combinations of power supply voltage level and clock signal frequency to corresponding bandwidths.

Referring briefly again to FIGS. 1A-1B, the PMIC 122 (or the PMIC 122 in combination with clock signal distribution-related components that are not shown for purposes of clarity) may provide power supply voltages and clock signals to shared components in the image processing pipeline. For example, as indicated by the broken-line arrows, a power supply voltage and clock signal, together characterizing a DCVS level, may be provided to each of the NoC 114, the system cache 116, the memory controller 118, and the system memory 120. The BW vote aggregator 124 may receive a BW vote from each transaction initiator component for each shared component (i.e., shared among the transaction initiator components). The DCVS voting described above with regard to the method 300 (FIG. 3) may be applied to each of the shared components independently of the others. As a result, different DCVS levels (i.e., power supply voltages and/or clock signal frequencies) may be applied to different shared components. In other words, the method 300 may be employed to determine a DCVS level for the NoC 114 based on received votes for NoC BW, while the method 300 may be employed again to determine a DCVS level for the system cache 116 based on received votes for system cache BW, employed still again to determine a DCVS level for the memory controller 118 based on received votes for memory controller BW, and employed yet again to determine a DCVS level for the system memory 120 based on received votes for system memory BW.

Figure 4:
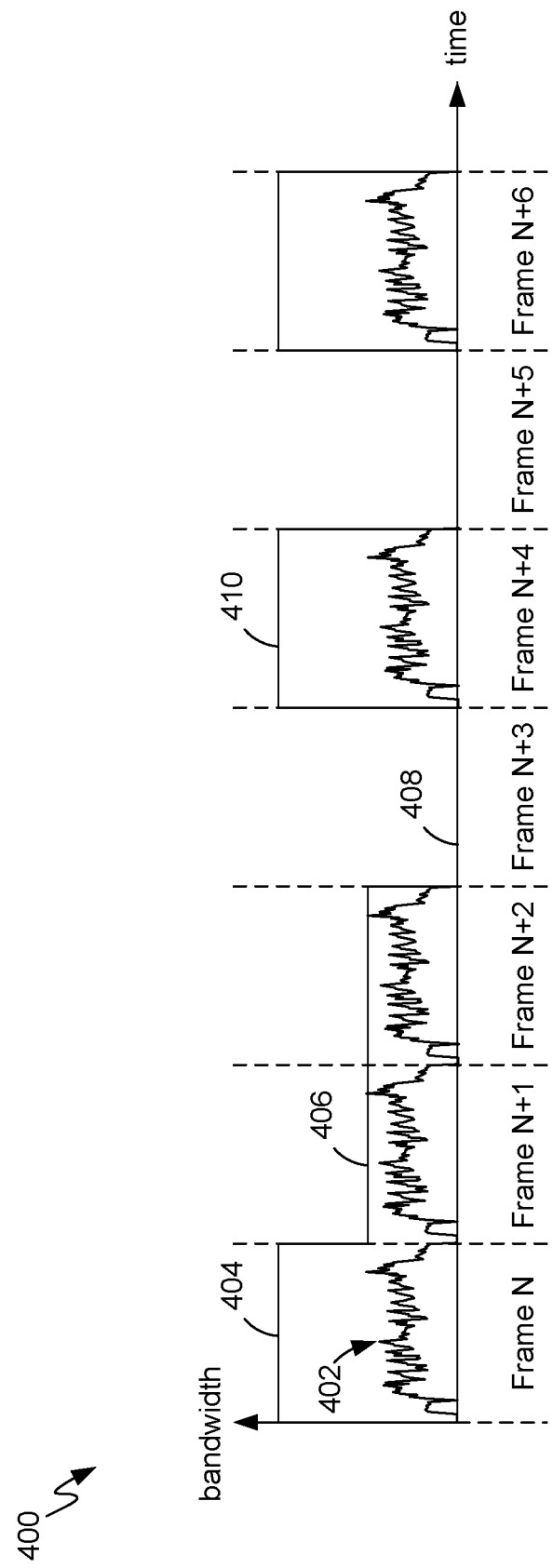
FIG. 4 is a signal diagram illustrating operation of a DCVS bandwidth voting method on an input image signal.

In FIG. 4, a timeline 400 illustrates an example of selecting or determining a DCVS level, i.e., a BW (vertical axis), based on BW votes received from transaction initiator components in successive frames (horizontal or time axis). The example shown in FIG. 4 may represent aspects of operation of the above-described system 100 (FIGS. 1A-1B), the selection logic 200 (FIG. 2), the method 300 (FIG. 3), etc. An incoming image BW 402 is also shown. It should be appreciated that the incoming image BW 402 is shown in conceptual form in FIG. 4 for purposes of clarity and may have any waveform, which may vary in any manner from frame to frame. It should be understood that the incoming image BW 402 corresponds to an incoming image stream, comprising successive frames.

At the beginning of the first frame, Frame_N, the first image processing component in the pipeline has not yet processed any image data frames. For example, in the system 100 (FIG. 1A) the sensor interface 104 has not yet captured a first frame received from the sensor 102. Under this condition (e.g., the start of image capture), each transaction initiator component may provide a BW vote representing a fixed, worst-case amount of BW. The BW vote aggregator 124 (FIGS. 1A-1B) may determine a BW level 404 corresponding to the sum of the BW votes that the BW vote aggregator 124 receives from transaction initiator components at the beginning of the first frame. Although represented in FIG. 4 as a BW level 404, 406, 408, 410, etc., such a BW level may be expressed as a DCVS level (i.e., a combination of voltage level and clock frequency) in the system 100 (FIG. 1). The first image processing component in the pipeline (e.g., the sensor interface 104 in a video capture use case) may calculate or determine a feedforward CR when it completes processing the first frame and may thereafter calculate or determine the feedforward CR each time it completes processing a successive frame. This feedforward CR may be propagated to each downstream transaction initiator component.

At the beginning of the next frame, Frame_N+1, each transaction initiator component may provide a BW vote that does not represent the worst-case amount of BW. As described above with regard to the method 300 (FIG. 3), a transaction initiator component provides a BW vote representing the fixed worst-case value only when the first image processing component in the pipeline has not yet processed the first frame of the incoming image stream. Rather, in the second and further frames each transaction initiator component may provide a BW vote representing one of: a measurement of the amount of BW used to process the previous frame; an estimated amount of BW needed to process the next frame; or a value based on the feedforward CR. Each transaction initiator component may calculate or otherwise maintain a value representing the change in the feedforward CR from the previous frame to the current frame. Which of the foregoing values a transaction initiator component selects as its BW vote may be based on the result of a comparison between the change in the feedforward CR and a threshold, as described above with regard to the method 300. In the illustrated example, the BW vote aggregator 124 (FIGS. 1A-1B) may determine a BW level 406 corresponding to the sum of the BW votes that the BW vote aggregator 124 receives from transaction initiator components at the beginning of the second frame, Frame_N+1.

At the beginning of the next frame, Frame_N+2, each transaction initiator component may again provide a BW vote that does not represent the worst-case amount of BW but rather again represents one of: a measurement of the amount of BW used to process the previous frame; an estimated amount of BW needed to process the next frame; or a value based on the feedforward CR. In the illustrated example, the BW vote aggregator 124 (FIGS. 1A-1B) may determine that the BW level 406 is maintained for the duration of the next frame.

Selecting a BW may continue in the manner described above during the next frame, Frame_N+3. In the illustrated example, each transaction initiator component may provide a BW vote representing zero bandwidth. Accordingly, the BW vote aggregator 124 (FIG. 1A) may select the (zero) BW level 408. During the next frame, Frame_N+4, the BW vote aggregator 124 may select the BW level 410 based on the BW votes received from transaction initiator components.

The BW selected by the BW vote aggregator 124 may be provided in the form of a DCVS level (i.e., a selected power supply voltage level and clock signal frequency) to the PMIC 122 (FIG. 1A). In accordance with DCVS principles, the PMIC 122 may provide to the transaction initiator components and the shared components a power supply signal having the selected voltage level and clock signal having the selected frequency. Bandwidth selection, and the attendant DCVS adjustment, may continue in this manner until image capture ends.

Figure 5:
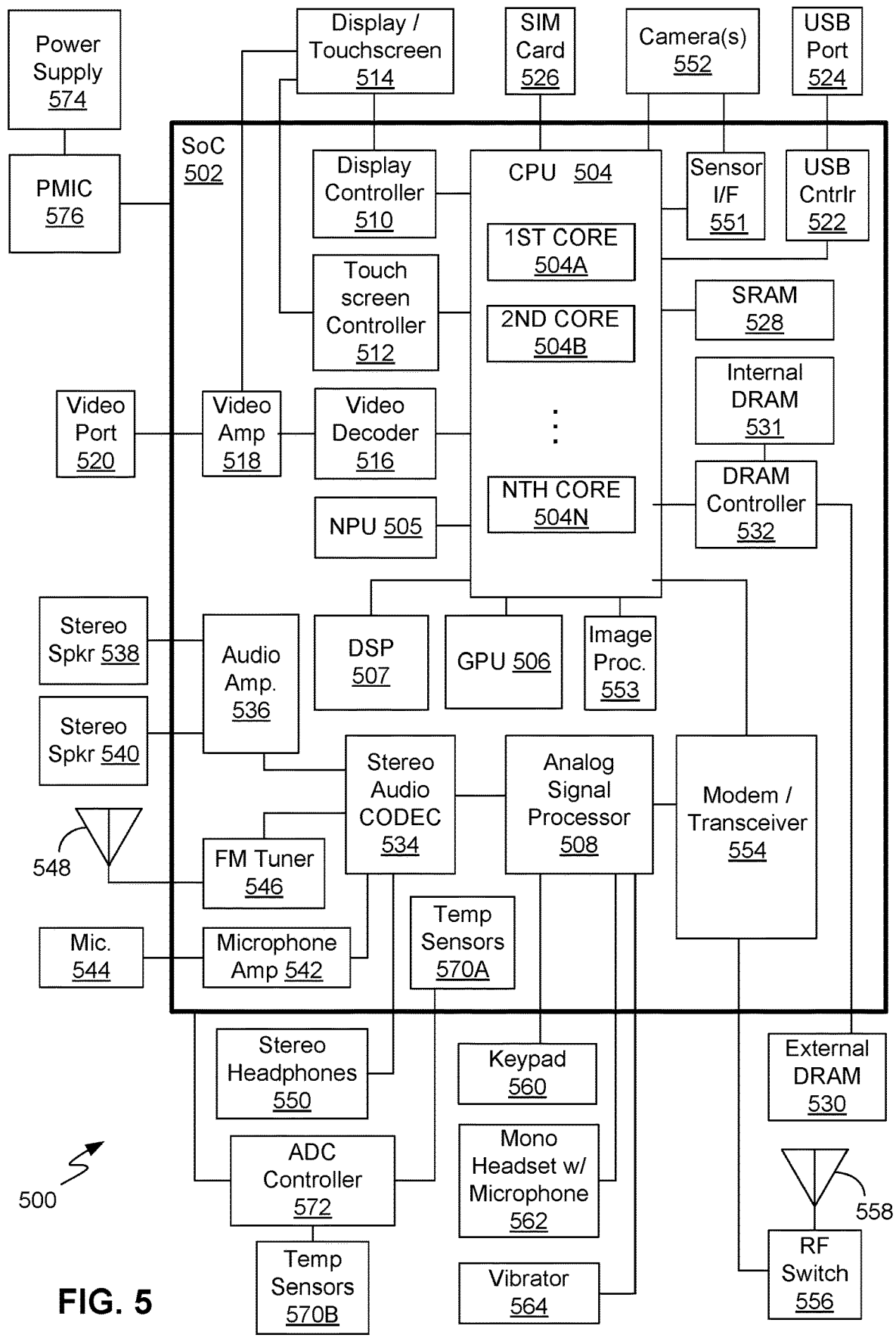
FIG. 5 is block diagram of a computing device, in accordance with exemplary embodiments.

FIG. 5 illustrates an example of a portable computing device ("PCD") 500, such as a mobile phone or smartphone, in which exemplary embodiments of systems, methods, computer-readable media, and other examples of DCVS BW voting may be provided. For purposes of clarity, some data buses, interconnects, signals, etc., are not shown in FIG. 5. For example, a NoC is not shown but may be included in the manner described above with regard to FIGS. 1A-1B. In contrast with the NoC-centric block diagram of FIG. 1B, FIG. 5 is a CPU-centric block diagram. Although the PCD 500 is shown as an example, other embodiments of systems, methods, computer-readable media, and other examples of DCVS BW voting may be provided in other types of computing devices or systems.

The PCD 500 may include an SoC 502. The SoC 502 may be an example of the above-described SoC 126 (FIGS. 1A-1B). The SoC 502 may include a central processing unit ("CPU") 504, a neural processing unit ("NPU") 505, a graphics processing unit ("GPU") 506, a digital signal processor ("DSP") 507, an analog signal processor 508, a modem/modem subsystem or RF transceiver 554, or other processors. The CPU 504 may include one or more CPU cores, such as a first CPU core 504A, a second CPU core 504B, etc., through an Nth CPU core 504N. The GPU 506 may be an example of the GPU 108 described above with regard to FIGS. 1A-1B.

A display controller 510 and a touch-screen controller 512 may be coupled to the CPU 504. A touchscreen display 514 external to the SoC 502 may be coupled to the display controller 510 and the touch-screen controller 512. The PCD 500 may further include a video decoder 516 coupled to the CPU 504. A video amplifier 518 may be coupled to the video decoder 516 and the touchscreen display 514. A video port 520 may be coupled to the video amplifier 518. A universal serial bus ("USB") controller 522 may also be coupled to CPU 504, and a USB port 524 may be coupled to the USB controller 522. A subscriber identity module ("SIM") card 526 may also be coupled to the CPU 504.

One or more memories may be coupled to the CPU 504. The one or more memories may include both volatile and non-volatile memories. Examples of volatile memories include static random access memory ("SRAM") 528 and dynamic random access memory ("DRAM") 530 and 531. Such memories may be external to the SoC 502, such as the DRAM 530, or internal to the SoC 502, such as the DRAM 531. A DRAM controller 532 coupled to the CPU 504 may control the writing of data to, and reading of data from, the DRAMs 530 and 531. The DRAM controller 532 may be an example of the memory controller 118 (FIGS. 1A-1B). The DRAM 530 or 531 may be an example of the system memory 120 (FIGS. 1A-1B).

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552. The digital cameras 552 may be examples of the sensor 102 (FIGS. 1A-1B). In addition to the GPU 506, other image processing components may include, for example, an sensor interface 551 and an image processor 553, which may be examples of the sensor interface 104 and image processor 106, respectively, described above with regard to FIGS. 1A-1B. Still other image processing components of the types described above with regard to FIGS. 1A-1B may be included in the PCD 500 but are not shown in FIG. 5 for purposes of clarity.

The modem or RF transceiver 554 may be coupled to the analog signal processor 508 and the CPU 504. An RF switch 556 may be coupled to the RF transceiver 554 and an RF antenna 558. In addition, a keypad 560, a mono headset with a microphone 562, and a vibrator device 564 may be coupled to the analog signal processor 508.

The SoC 502 may have one or more internal or on-chip thermal sensors 570A and may be coupled to one or more external or off-chip thermal sensors 570B. An analog-to-digital converter controller 572 may convert voltage drops produced by the thermal sensors 570A and 570B to digital signals. A power supply 574 and a PMIC 576 may supply power to the SoC 502.

Firmware or software may be stored in any of the above-described memories, such as DRAM 530 or 531, SRAM 528, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses:

1. A system for dynamic clock and voltage scaling (DCVS) bandwidth voting, comprising:
    a pipeline comprising a plurality of image processing components, a first image processing component in the pipeline configured to determine a feedforward compression ratio based on a current frame of an image, the plurality of image processing components including a plurality of transaction initiator components, a transaction initiator component of the plurality of transaction initiator components configured to select a bandwidth vote from among a feedforward compression ratio-based value and one or more other values based on a result of a comparison of the change in the feedforward compression ratio with the threshold; and
    a bandwidth vote aggregator configured to determine a DCVS level based on a plurality of bandwidth votes received from the plurality of transaction initiator components.

2. The system of clause 1, wherein the transaction initiator component is configured to determine a change in the feedforward compression ratio from a preceding frame to the current frame and to compare the change in the feedforward compression ratio with a threshold and to select the bandwidth vote based on a result of a comparison of the change in the feedforward compression ratio with the threshold.

3. The system of clause 1 or 2, wherein the one or more other values include: a fixed worst-case value; a measurement of an amount of bandwidth used to process a previous frame; and an estimated amount of bandwidth to process a next frame.

4. The system of any of clauses 1-3, wherein the transaction initiator component is configured to select the bandwidth vote by being configured to select the fixed worst-case value only when the first image processing component has not yet processed a first frame of the image.

5. The system of any of clauses 2-4, wherein the transaction initiator component is configured to select the bandwidth vote by being configured to select an estimated amount of bandwidth to process a next frame when the change in the feedforward compression ratio is greater than the threshold.

6. The system of any of clauses 2-5, wherein the transaction initiator component is configured to select the bandwidth vote by being configured to select the feedforward compression ratio-based value when the change in the feedforward compression ratio is less than the threshold.

7. The system of any of clauses 2-6, wherein the transaction initiator component is configured to select the bandwidth vote by being configured to select the feedforward compression ratio-based value when the change in the feedforward compression ratio is less than the threshold for fewer than two consecutive frames.

8. The system of any of clauses 2-7, wherein the transaction initiator component is configured to select the bandwidth vote by being configured to select a measurement of an amount of bandwidth used to process a previous frame when the change in the feedforward compression ratio is less than the threshold and the feedforward compression ratio-based value is greater than the amount of bandwidth used to process the previous frame.

9. The system of any of clauses 2-8, wherein the transaction initiator component is configured to select the bandwidth vote by being configured to select the feedforward compression ratio-based value when the change in the feedforward compression ratio is less than the threshold and the feedforward compression ratio=-based value is not greater than the amount of bandwidth used to process the previous frame.

10. The system of any of clauses 1-9, further comprising power management circuitry configured to provide a power supply voltage and a clock signal corresponding to the DCVS level to at least one shared processing component of the plurality of image processing components.

11. The system of any of clauses 1-10, wherein the plurality of image processing components includes a sensor interface having an sensor interface input coupled to an image sensor, an image processor having an image processor input coupled an sensor interface output, and a display subsystem having a display input coupled to an image processor output.

12. The system of any of clauses 1-11, wherein the plurality of transaction initiator components includes a graphic processing unit (GPU) having a GPU input coupled to the image processor output.

13. A method for dynamic clock and voltage scaling (DCVS) bandwidth voting, comprising:
    determining, by a first image processing component in a pipeline comprising a plurality of image processing components, a feedforward compression ratio based on a current frame of an image, the plurality of image processing components including a plurality of transaction initiator components;

selecting, by the transaction initiator component, a bandwidth vote from among a feedforward compression ratio-based value and one or more other values; and determining, by a bandwidth vote aggregator, a DCVS level based on a plurality of bandwidth votes received from the plurality of transaction initiator components.

14. The method of clause 13, wherein selecting the bandwidth vote comprises:

determining a change in the feedforward compression ratio from a preceding frame to the current frame;

comparing the change in the feedforward compression ratio with a threshold; and selecting the bandwidth vote based on a result of comparing the change in the feedforward compression ratio with the threshold.

15. The method of clause 13 or 14, wherein the one or more other values include: a fixed worst-case value; a measurement of an amount of bandwidth used to process a previous frame; and an estimated amount of bandwidth to process a next frame.

16. The method of any of clauses 13-15, wherein selecting the bandwidth vote comprises selecting the fixed worst-case value only when the first image processing component has not yet processed a first frame of the image.

17. The method of any of clauses 14-16, wherein selecting the bandwidth vote comprises selecting an estimated amount of bandwidth to process a next frame when the change in the feedforward compression ratio is greater than the threshold.

18. The method of any of clauses 14-17, wherein selecting the bandwidth vote comprises selecting the feedforward compression ratio-based value when the change in the feedforward compression ratio is less than the threshold.

19. The method of any of clauses 14-18, wherein selecting the bandwidth vote comprises selecting the feedforward compression ratio-based value when the change in the feedforward compression ratio is less than the threshold for fewer than two consecutive frames.

20. The method of any of clauses 14-19, wherein selecting the bandwidth vote comprises selecting a measurement of an amount of bandwidth used to process a previous frame when the change in the feedforward compression ratio is less than the threshold and the feedforward compression ratio-based value is greater than the amount of bandwidth used to process the previous frame.

21. The method of any of clauses 14-20, wherein selecting the bandwidth vote comprises selecting the feedforward compression ratio-based value when the change in the feedforward compression ratio is less than the threshold and the feedforward compression ratio-based value is not greater than the amount of bandwidth used to process the previous frame.

22. A system for dynamic clock and voltage scaling (DCVS) bandwidth voting, comprising:

means for determining a feedforward compression ratio based on a current frame of an image;

means for selecting a bandwidth vote from among a feedforward compression ratio-based value and one or more other values; and determining a DCVS level based on a plurality of bandwidth votes.

23. The system of clause 22, wherein the means for selecting the bandwidth vote comprises:

means for determining a change in the feedforward compression ratio from a preceding frame to the current frame;

means for comparing the change in the feedforward compression ratio with a threshold, wherein the bandwidth vote is selected based on a result of the means for comparing.

24. The system of clause 22 or 23, wherein the one or more other values include: a fixed worst-case value; a measurement of an amount of bandwidth used to process a previous frame; and an estimated amount of bandwidth to process a next frame.

25. The system of any of clauses 22-24, wherein selecting the bandwidth vote comprises selecting the fixed worst-case value only when the first image processing component has not yet processed a first frame of the image.

26. The system of any of clauses 23-25, wherein selecting the bandwidth vote comprises selecting an estimated amount of bandwidth to process a next frame when the change in the feedforward compression ratio is greater than the threshold.

27. The system of any of clauses 23-26, wherein selecting the bandwidth vote comprises selecting the feedforward compression ratio-based value when the change in the feedforward compression ratio is less than the threshold.

28. The system of any of clauses 23-27, wherein selecting the bandwidth vote comprises selecting the feedforward compression ratio-based value when the change in the feedforward compression ratio is less than the threshold for fewer than two consecutive frames.

29. The system of any of clauses 23-28, wherein selecting the bandwidth vote comprises selecting a measurement of an amount of bandwidth used to process a previous frame when the change in the feedforward compression ratio is less than the threshold and the feedforward compression ratio-based value is greater than the amount of bandwidth used to process the previous frame, 30. The system of any of clauses 23-29, wherein selecting the bandwidth vote comprises selecting the feedforward compression ratio-based value when the change in the feedforward compression ratio is less than the threshold and the feedforward compression ratio-based value is not greater than the amount of bandwidth used to process the previous frame.

31. A computer-readable medium for dynamic clock and voltage scaling (DCVS) bandwidth voting, the computer-readable medium comprising a non-transitory computer-readable medium having instructions stored thereon in computer-executable form, the instructions when executed by a processing system of a computing device configuring the processing system to control:

determining, by a first image processing component in a pipeline comprising a plurality of image processing components, a feedforward compression ratio based on a current frame of an image, the plurality of image processing components including a plurality of transaction initiator components;

selecting, by a transaction initiator component of the plurality of transaction initiator components, a bandwidth vote from among a feedforward compression ratio-based value and one or more other values; and determining, by a bandwidth vote aggregator, a DCVS level based on a plurality of bandwidth votes received from the plurality of transaction initiator components.

32. The computer-readable medium of clause 31, wherein selecting the bandwidth vote comprises:
  determining a change in the feedforward compression ratio from a preceding frame to the current frame;
  comparing, by a transaction initiator component of the plurality of transaction initiator components, the change in the feedforward compression ratio with a threshold; and
  selecting the bandwidth vote based on a result of comparing the change in the feedforward compression ratio with the threshold.

33. The computer-readable medium of clause 31 or 32, wherein the one or more other values include: a fixed worst-case value; a measurement of an amount of bandwidth used to process a previous frame; and an estimated amount of bandwidth to process a next frame.

34. The computer-readable medium of any of clauses 31-33, wherein selecting the bandwidth vote comprises selecting the fixed worst-case value only when the first image processing component has not yet processed a first frame of the image.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A system for dynamic clock and voltage scaling (DCVS) bandwidth voting, comprising:
  a pipeline comprising a plurality of image processing components, a first image processing component in the pipeline is configured to determine a feedforward compression ratio based on a current frame of an image, the plurality of image processing components including a plurality of transaction initiator components, each transaction initiator component of the plurality of transaction initiator components is configured to select a bandwidth vote during the image processing and to transmit the bandwidth vote to a bandwidth aggregator during the image processing, each transaction initiator component selects the bandwidth vote during image processing by determining if the feedforward compression ratio-based value has changed; and
  the bandwidth vote aggregator configured to determine a DCVS level based bandwidth votes received from each of the plurality of transaction initiator components.

2. The system of claim 1, wherein each transaction initiator component is configured to determine a change in the feedforward compression ratio from a preceding frame to the current frame and to compare the change in the feedforward compression ratio with a threshold and to select the bandwidth vote based on a result of a comparison of the change in the feedforward compression ratio with the threshold.

3. The system of claim 2, wherein each transaction initiator component is configured to select the bandwidth vote by being configured to select an estimated amount of bandwidth to process a next frame when the change in the feedforward compression ratio is greater than the threshold.

4. The system of claim 2, wherein each transaction initiator component is configured to select the bandwidth vote by being configured to select the feedforward compression ratio-based value when the change in the feedforward compression ratio is less than the threshold.

5. The system of claim 4, wherein each transaction initiator component is configured to select the bandwidth vote by being configured to select the feedforward compression ratio-based value when the change in the feedforward compression ratio is less than the threshold for fewer than two consecutive frames.

6. The system of claim 4, wherein each transaction initiator component is configured to select the bandwidth vote by being configured to select a measurement of an amount of bandwidth used to process a previous frame when the change in the feedforward compression ratio is less than the threshold and the feedforward compression ratio-based value is greater than the amount of bandwidth used to process the previous frame.

7. The system of claim 6, wherein each transaction initiator component is configured to select the bandwidth vote by being configured to select the feedforward compression ratio-based value when the change in the feedforward compression ratio is less than the threshold and the feedforward compression ratio-based value is not greater than the amount of bandwidth used to process the previous frame.

8. The system of claim 1, wherein each bandwidth vote comprises one of: a fixed worst-case value; a measurement of an amount of bandwidth used to process a previous frame; and an estimated amount of bandwidth to process a next frame.

9. The system of claim 1, wherein the bandwidth vote comprising a fixed worst-case value is only available when the first image processing component has not yet processed a first frame of the image.

10. The system of claim 1, further comprising power management circuitry configured to provide a power supply voltage and a clock signal corresponding to the DCVS level to at least one shared processing component of the plurality of image processing components.

11. The system of claim 1, wherein the plurality of image processing components includes a sensor interface having an sensor interface input coupled to an image sensor, an image processor having an image processor input coupled to a sensor interface output, and a display subsystem having a display input coupled to an image processor output.

12. The system of claim 1, wherein the plurality of transaction initiator components includes a graphic processing unit (GPU) having a GPU input coupled to an output of the first image processing component.

13. A method for dynamic clock and voltage scaling (DCVS) bandwidth voting, comprising:
  determining, by a first image processing component in a pipeline comprising a plurality of image processing components, a feedforward compression ratio based on a current frame of an image, the plurality of image processing components including a plurality of transaction initiator components;
  selecting, by each transaction initiator component of the plurality of transaction initiator components, a bandwidth vote during the image processing and to transmit the bandwidth vote to a bandwidth aggregator during the image processing, each transaction initiator component selects the bandwidth vote during image processing by determining if the feedforward compression ratio-based value has changed; and
  determining, by the bandwidth vote aggregator, a DCVS level based on the bandwidth vote received from each of the plurality of transaction initiator components.

14. The method of claim 13, wherein selecting the bandwidth vote by each transaction initiator comprises:
  determining a change in the feedforward compression ratio from a preceding frame to the current frame;
  comparing the change in the feedforward compression ratio with a threshold; and selecting the bandwidth vote based on a result of comparing the change in the feedforward compression ratio with the threshold.

15. The method of claim 14, wherein each bandwidth vote comprises one of: a fixed worst-case value; a measurement of an amount of bandwidth used to process a previous frame; and an estimated amount of bandwidth to process a next frame.

16. The method of claim 15, wherein the bandwidth vote comprising a fixed worst-case value is only available when the first image processing component has not yet processed a first frame of the image.

17. The method of claim 14, wherein selecting the bandwidth vote by each transaction initiator comprises selecting an estimated amount of bandwidth to process a next frame when the change in the feedforward compression ratio is greater than the threshold.

18. The method of claim 14, wherein selecting the bandwidth vote by each transaction initiator comprises selecting the feedforward compression ratio-based value when the change in the feedforward compression ratio is less than the threshold.

19. The method of claim 18, wherein selecting the bandwidth vote by each transaction initiator comprises selecting the feedforward compression ratio-based value when the change in the feedforward compression ratio is less than the threshold for fewer than two consecutive frames.

20. The method of claim 18, wherein selecting the bandwidth vote by each transaction initiator comprises selecting a measurement of an amount of bandwidth used to process a previous frame when the change in the feedforward compression ratio is less than the threshold and the feedforward compression ratio-based value is greater than the amount of bandwidth used to process the previous frame.

21. The method of claim 20, wherein selecting the bandwidth vote by each transaction initiator comprises selecting the feedforward compression ratio-based value when the change in the feedforward compression ratio is less than the threshold and the feedforward compression ratio-based value is not greater than the amount of bandwidth used to process the previous frame.

22. A system for dynamic clock and voltage scaling (DCVS) bandwidth voting, comprising:
means for determining a feedforward compression ratio based on a current frame of an image;
a plurality of transaction initiator components, each transaction initiator component comprising means for selecting a bandwidth vote during the image processing and means for transmitting the bandwidth vote during image processing to a bandwidth aggregator, the means for selecting further comprising means for determining if the feedforward compression ratio-based value has changed; and
the bandwidth aggregator determining a DCVS level based on the bandwidth vote received from each of the plurality of transaction initiator components.

23. The system of claim 22, wherein the means for selecting the bandwidth vote comprises:
means for determining a change in the feedforward compression ratio from a preceding frame to the current frame; and
means for comparing the change in the feedforward compression ratio with a threshold, wherein the bandwidth vote is selected based on a result of the means for comparing.

24. The system of claim 23, wherein each bandwidth vote comprises one of: a fixed worst-case value; a measurement of an amount of bandwidth used to process a previous frame; and an estimated amount of bandwidth to process a next frame.

25. The system of claim 24, wherein the bandwidth vote comprises a fixed worst-case value only when the first image processing component has not yet processed a first frame of the image.

26. The system of claim 23, wherein the means for selecting the bandwidth vote comprises means for selecting an estimated amount of bandwidth to process a next frame when the change in the feedforward compression ratio is greater than the threshold.

27. The system of claim 23, wherein the means for selecting the bandwidth vote comprises means for selecting the feedforward compression ratio-based value when the change in the feedforward compression ratio is less than the threshold.

28. The system of claim 27, wherein the means for selecting the bandwidth vote comprises means for selecting the feedforward compression ratio-based value when the change in the feedforward compression ratio is less than the threshold for fewer than two consecutive frames.

29. The system of claim 27, wherein the means for selecting the bandwidth vote comprises means for selecting a measurement of an amount of bandwidth used to process a previous frame when the change in the feedforward compression ratio is less than the threshold and the feedforward compression ratio-based value is greater than the amount of bandwidth used to process the previous frame.

30. The system of claim 29, wherein the means for selecting the bandwidth vote comprises means for selecting the feedforward compression ratio-based value when the change in the feedforward compression ratio is less than the threshold and the feedforward compression ratio-based value is not greater than the amount of bandwidth used to process the previous frame.

31. A computer-readable medium for dynamic clock and voltage scaling (DCVS) bandwidth voting, the computer-readable medium comprising a non-transitory computer-readable medium having instructions stored thereon in computer-executable form, the instructions when executed by a processing system of a computing device configuring the processing system to control:
determining, by a first image processing component in a pipeline comprising a plurality of image processing components, a feedforward compression ratio based on a current frame of an image, the plurality of image processing components including a plurality of transaction initiator components;
selecting during the image processing, by each transaction initiator component of the plurality of transaction initiator components, a bandwidth vote and transmitting the bandwidth vote during image processing to a bandwidth aggregator, each transaction initiator component selects the bandwidth vote during the image processing by determining if the feedforward compression ratio-based value has changed; and
determining, by the bandwidth vote aggregator, a DCVS level based on the bandwidth vote received from each of the plurality of transaction initiator components.

32. The computer-readable medium of claim 31, wherein each transaction initiator component selecting the bandwidth vote comprises:
determining a change in the feedforward compression ratio from a preceding frame to the current frame;
comparing the change in the feedforward compression ratio with a threshold; and selecting the bandwidth vote based on a result of comparing the change in the feedforward compression ratio with the threshold.

33. The computer-readable medium of claim 32, wherein each bandwidth vote comprises one of: a fixed worst-case value; a measurement of an amount of bandwidth used to process a previous frame; and an estimated amount of bandwidth to process a next frame.

34. The computer-readable medium of claim 33, wherein the bandwidth vote comprises a fixed worst-case value only when the first image processing component has not yet processed a first frame of the image.

* * * * *